US011178733B2

United States Patent
(12) United States Patent
Ak

(10) Patent No.: US 11,178,733 B2
(45) Date of Patent: Nov. 16, 2021

(54) COOKER

(71) Applicant: Vestel Elektronik Sanayi ve Ticaret A.Ş, Manisa (TR)

(72) Inventor: Yusuf Ak, Manisa (TR)

(73) Assignee: Vestel Elektronik Sanayi ve Ticaret A.S., Manisa (TR)

( * ) Notice: Subject to any disclaimer, the term of this patent is extended or adjusted under 35 U.S.C. 154(b) by 331 days.

(21) Appl. No.: 16/276,407

(22) Filed: Feb. 14, 2019

(65) Prior Publication Data

US 2019/0254124 A1 Aug. 15, 2019

(30) Foreign Application Priority Data

Feb. 14, 2018 (EP) .................................... 18156812

(51) Int. Cl.
*H05B 6/12* (2006.01)
*H05B 1/02* (2006.01)

(52) U.S. Cl.
CPC ......... *H05B 6/1209* (2013.01); *H05B 1/0266* (2013.01); *H05B 6/1245* (2013.01); *H05B 2213/07* (2013.01)

(58) Field of Classification Search
CPC ......................... H05B 1/0266; H05B 2213/07; H05B 6/1209; H05B 6/1245; Y02B 40/00
USPC ....... 219/622, 413, 400, 385, 386, 412, 405, 219/411; 99/288, 279–282, 304–306, 99/307; 165/96 R, 96 HV, 32 HV; 126/374
See application file for complete search history.

(56) References Cited

U.S. PATENT DOCUMENTS

| | | | | |
|---|---|---|---|---|
| 4,772,777 A * | 9/1988 | Weller | .................. | A47J 31/545 165/276 |
| 2017/0019957 A1* | 1/2017 | Fryshman | ............. | A61B 5/026 |

FOREIGN PATENT DOCUMENTS

| | | |
|---|---|---|
| DE | 1106440 | 2/1956 |
| EP | 0183163 | 6/1986 |
| EP | 1339257 | 8/2003 |
| EP | 3244694 | 11/2017 |
| JP | 54104052 | 8/1979 |
| JP | 2007330453 | 12/2007 |

* cited by examiner

*Primary Examiner* — Dana Ross
*Assistant Examiner* — Ket D Dang
(74) *Attorney, Agent, or Firm* — Brandon V. Zuniga; James R. Gourley; Carstens & Cahoon, LLP

(57) ABSTRACT

There is provided a cooker having at least one heating element (200). The cooker also has a supporting structure for supporting a cooking vessel above the heating element (200) and a bi-metallic element (202). The bi-metallic element (202) drives the heating element (200) to move based on a temperature of the bi-metallic element (202).

10 Claims, 4 Drawing Sheets

202
200
202'
300
302

COOKER

CROSS-REFERENCE TO RELATED APPLICATIONS

This application claims the benefit under 35 U.S.C. § 119(a) and 37 CFR § 1.55 to European patent application 18156812.2 filed Feb. 14, 2018, the entire content of which is incorporated herein by reference.

TECHNICAL FIELD

The present disclosure relates to a cooker.

BACKGROUND

Induction cookers are known in which a varying electric current is passed through an induction coil, the coil therefore producing a corresponding varying electromagnetic field. The varying electromagnetic field induces a varying eddy current in a ferromagnetic cooking vessel or the like when the cooking vessel is placed in close proximity to the induction coil, which in turn heats the cooking vessel and therefore the contents of the cooking vessel. It is beneficial for a cooking vessel to be positioned centrally over the induction coil to ensure an intended heating effect and to maximise the heating effect and efficiency.

SUMMARY

According to an aspect disclosed herein, there is provided a cooker comprising:

a heating element;

a supporting structure for supporting a cooking vessel above the heating element; and a bi-metallic element, the bi-metallic element being arranged to drive the heating element to move based on the temperature of the bi-metallic element.

In an example, the cooker comprises a connector arrangement for selectively connecting the bi-metallic element to the heating element when the bi-metallic element is heated so that the bi-metallic element drives the heating element to move when the at least one bi-metallic element is deformed.

In an example, the connector arrangement comprises:

the heating element comprising one of a groove and a protrusion and the bi-metallic element comprising one of a groove and a protrusion, such that:

the groove or the protrusion of the heating element selectively engages with the groove or protrusion of the bi-metallic element when the bi-metallic element is deformed; and the groove or the protrusion of the heating element disengages from the groove or protrusion of the bi-metallic element when the bi-metallic element is not deformed.

In an example, the cooker comprises plural bi-metallic elements arranged to drive the heating element, the bi-metallic elements being arranged to drive the heating element to move based on the respective temperatures of the bi-metallic elements.

In an example, the or each bi-metallic element is arranged to extend in a plane radially from the heating element.

In an example, the cooker comprises a biasing member arranged to assist the movement of the heating element based on an increased temperature of the bi-metallic element.

In an example, the cooker comprises a biasing member arranged to assist movement of the heating element to a default location when the heating element is switched off or no cooking vessel is located above the heating element.

In an example, wherein the heating element is an induction heating element.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
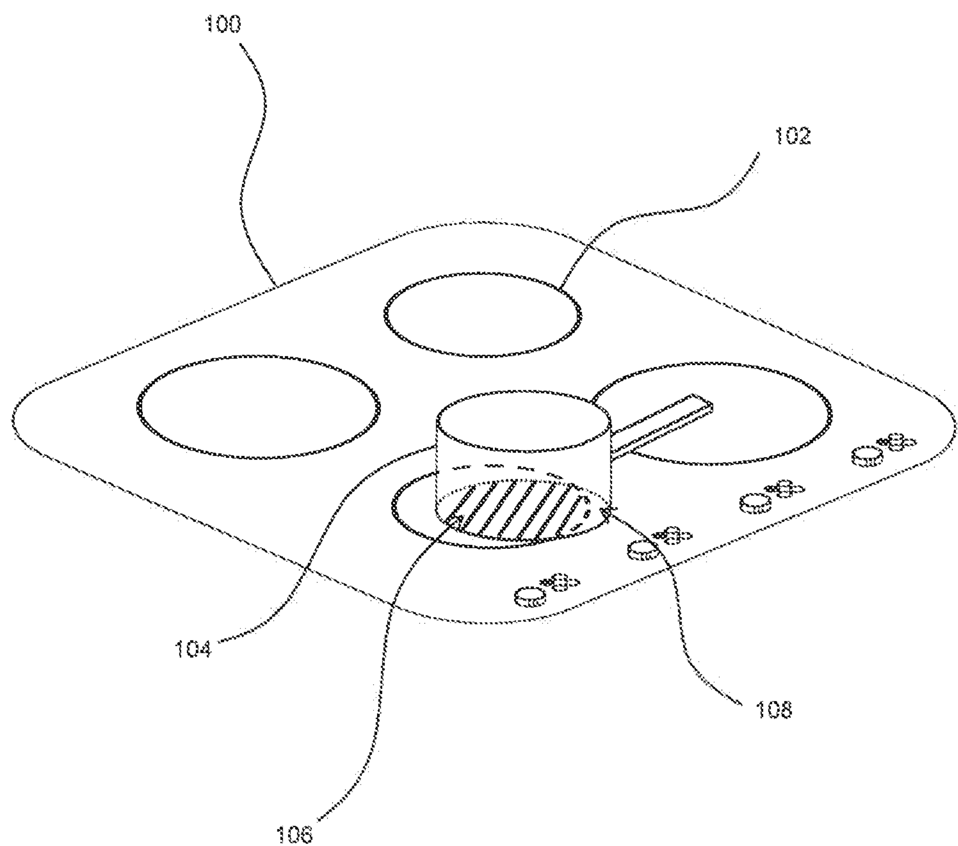
FIG. 1 shows schematically a perspective of an example of a cooker as described herein.

As mentioned previously, if a cooking vessel is not, or cannot, be positioned to be centrally above a heating element of a cooker, the cooking vessel will not be heated in an intended way. For many heating elements, heating is most efficient or effective if the cooking vessel is located centrally over the heating element. In practice, however, users may not always perfectly align the cooking vessel in this way.

According to examples disclosed herein, there is provided a cooker having at least one heating element, a supporting structure for supporting a cooking vessel above the heating element; and a bi-metallic element. The bi-metallic element is arranged to drive the heating element to move based on the temperature of the bi-metallic element. This can bring the heating element into alignment with the cooking vessel and, in particular, can centre the heating element under the cooking vessel in examples.

Referring to the drawings, there is shown schematically a first perspective view of an example of a cooker 100. The cooker 100 is a hob 100 having plural heating areas or zones 102. In this example, the cooker 100 comprises four heating areas 102. Additionally, as is known, the cooker 100 may optionally also comprise at least one of a grill and an oven.

In this example, the cooker 100 is an induction cooker 100, wherein the heating areas 102 each comprise an induction heating element 200 in the form of an induction coil. In other examples, the cooker 100 may be an "electric" cooker, i.e. in which the heating elements are electrically resistive heating elements. The cooker 100 may be of another type having a different heating arrangement.

A cooking vessel 104 is shown in FIG. 1 placed on a heating area 102 of the cooker 100. In this example the cooking vessel 104 is compatible with an induction cooker 100. When the cooker 100 is in operation, the cooking vessel 104 is arranged to increase in temperature.

Cooking vessels 104 that are compatible with an induction heating element 200 of an induction cooker 100 comprise a ferromagnetic base. In an example, the cooking vessel may be entirely made of a ferromagnetic material. When the induction cooker 100 is in operation, the induction heating element 200 associated with a heating area 102 is energised by an alternating current. When the cooking vessel 104 is placed upon the heating area 102, eddy currents are induced in the cooking vessel 104, causing an increase in the temperature of the ferromagnetic base or material of the cooking vessel 104. The heat is conducted to the remainder, body portion of the cooking vessel 104.

For even and efficient heating of the cooking vessel 104, the cooking vessel 104 is ideally placed directly and centrally above the heating area 102. However, as shown in FIG. 1, part of the base of the cooking vessel 104 is not in contact with or above the heating area 102, because for example the user has not placed the cooking vessel 104 centrally over the heating area 102. A first portion 106 (shown with hatching) of the base of the cooking vessel 104 which is in contact with or above the heating area 102 is caused to increase in temperature by the eddy currents induced by an induction heating element 200 of the cooker 100 and the cooking vessel 104. A second portion 108 (shown plain in the drawing) of the base of the cooking vessel 104 not in contact with or above the heating area 102 and as a consequence is only caused to increase in temperature by conduction of heat from the first portion 106 of the base of the cooking vessel 104.

Examples described herein cause the heating element 200 of the heating area 102 to be driven to move such that heating element 200 is located centrally below the cooking vessel 104, allowing a larger portion of the base or the whole of the base of the cooking vessel 104 to be heated as intended by eddy currents induced in the cooking vessel 104 by the heating element 200 of the cooker 100. This improves the efficiency and effectiveness of the heating of the cooking vessel 104.

Figure 2:
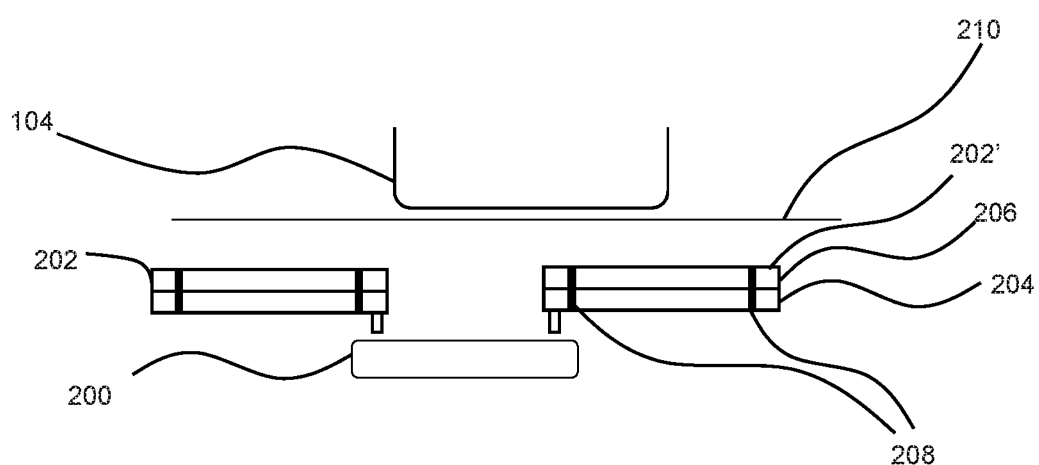
FIG. 2 shows schematically a side view of a portion of the cooker of FIG. 1.
Figure 3A:
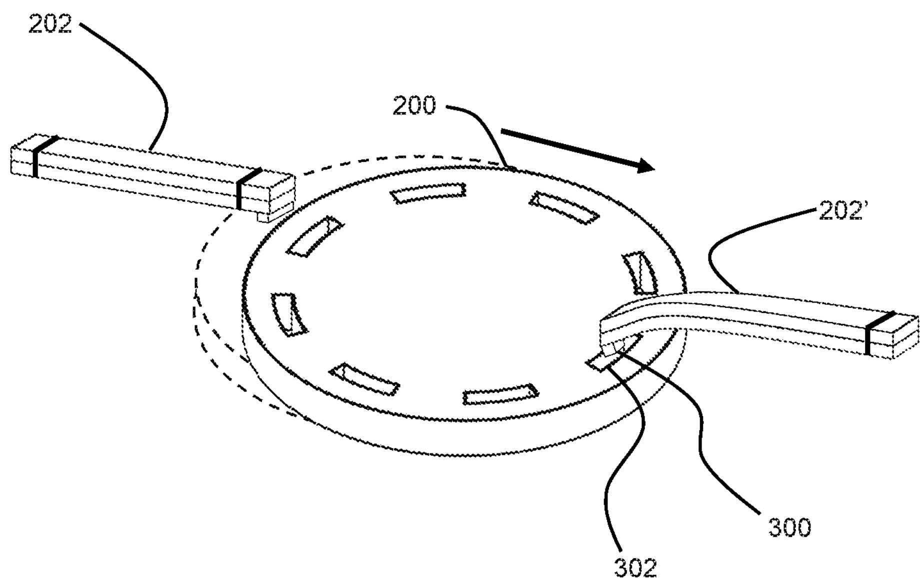
FIGS. 3A and 3B show schematically perspective views of a portion of the cooker of FIG. 1.
Figure 3B:
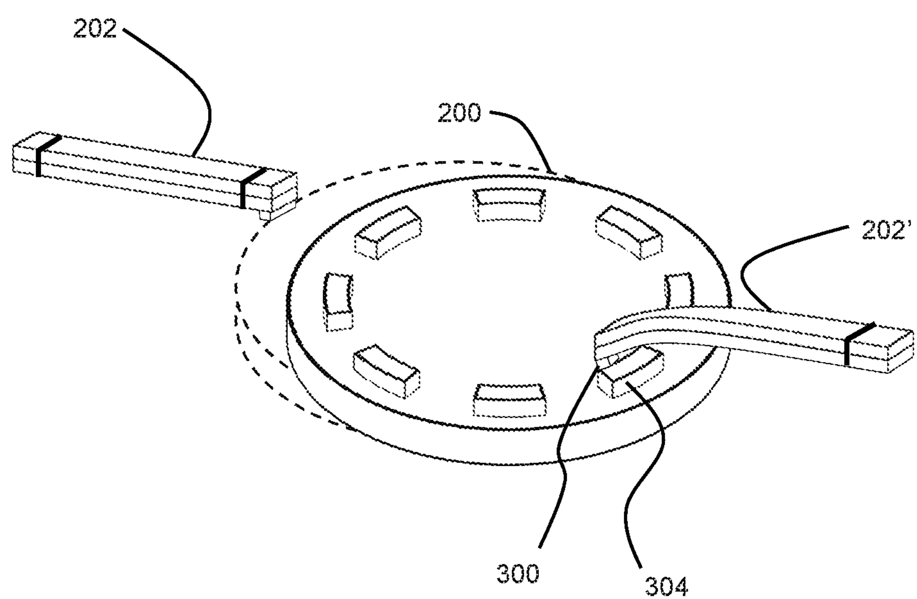
Figure 4:
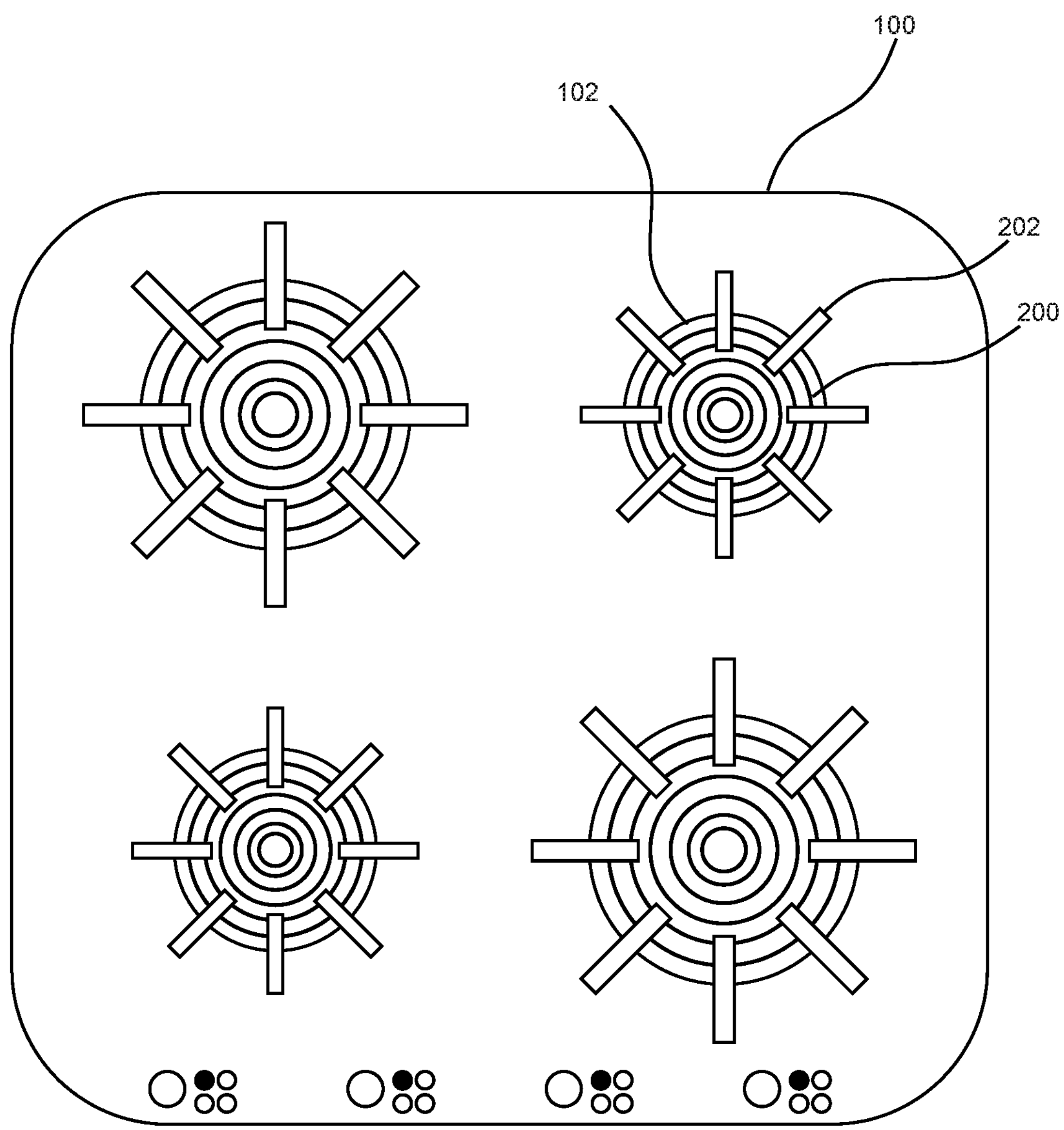
FIG. 4 shows schematically a plan view of an example of the cooker of FIG. 1.

Referring to FIGS. 2 to 4 in particular, in this example at least one bi-metallic element 202 is associated with the heating element 200, to drive movement of the heating element 200 when the heating element 200 is not centrally aligned with the cooking vessel 104. The bi-metallic element 202 is composed of a first metal layer 204 and a second metal layer 206. The thermal expansion coefficients of the two layers 204, 206 are different such that as the bi-metallic element 202 is heated, one layer expands more than the other. In this example, the first (lower) metal layer 204 expands more than the second (upper) metal layer 206, though this can be reversed in other arrangements. The metal layers 204, 206 of the bi-metallic element 202 are fixedly joined together by fixed connections 208, such as straps, or otherwise fixed to each other at or towards each end of the bi-metallic element 202 and/or along the length of the bi-metallic element 202. When the bi-metallic element 202 is caused to increase in temperature, the expansion of the first metal layer 204 causes the bi-metallic element 202 to bend. When at normal room temperature, each bi-metallic element 202 lies flat within the cooker 100.

The cooking vessel 104 is held above the heating element 200 by a supporting structure 210. The supporting structure 210 is made, wholly or in part, of a material that has a high thermally conductivity, to allow the bi-metallic element(s) 202 to be heated when it underlies at least in part the cooking vessel 104. The support structure 210 may in one example be entirely made of the material having a high thermally conductivity, or, in another example, only the heating areas 102 and optionally also the region of the supporting structure 210 immediately surrounding the heating areas 102 may be made of the thermally conductive material.

When the cooker 100 is in operation and the cooking vessel 104 is not fully or centrally aligned with the heating element 200, the cooking vessel 104 will be overlying (at least) one bi-metallic element 202'. In this example, the one bi-metallic element 202' is in thermal contact with the cooking vessel 104, and so heat transferring from the cooking vessel 104 to the bi-metallic element 202' causes the bi-metallic element 202' to curve downwards.

The cooker 100 in this example comprises a connector arrangement 300, 302, 304 for connecting the bi-metallic elements 202 to the heating element 200. The connector arrangement 300, 302, 304 is arranged to cause a bi-metallic element 202 to selectively engage with the heating element 200 when the bi-metallic element 202 deforms when heated by conducting heat from the cooking vessel 104. This will cause the bi-metallic element 202 to drive the now engaged heating element 200 to move when the at least one bi-metallic element 202 deforms. The connector arrangement 300, 302, 304 is arranged to cause the bi-metallic element 202 to disengage from the heating element 200 when the bi-metallic element 202 returns to its default, rest state.

In an example, the connector arrangement 300, 302, 304 comprises a protrusion 300 on the bi-metallic element 200, the protrusion 300 being arranged to cause the bi-metallic element 202' to engage with the heating element 200 when the bi-metallic element 202' is heated. The protrusion 300 may, for example, be a hook or tongue or the like, arranged to form a connection with the heating element 200 when the bi-metallic element 202 curves down towards the heating element 200. In another example, the connector arrangement 300, 302, 304 comprises a groove (not shown) on the bi-metallic element 200, the groove being arranged to cause the bi-metallic element 202' to engage with the heating element 200 when the bi-metallic element 202' is heated.

In an example, the connector arrangement 300, 302, 304 comprises at least one hole or groove 302 located on a surface of the heating element 200 parallel to the base of the cooking vessel 104. In one example, the groove 302 is a blind recess 302. The bi-metallic element 202 is arranged to be positioned above or below the groove 302 of the heating element 200 such that when the bi-metallic element 202 heats up and curves towards the heating element 200, in one example the protrusion 300 of the bi-metallic element 202 engages with the corresponding groove 302 of the heating element 200. In this example, the curved bi-metallic element 202' engages with the heating element 200 by virtue of the protrusion 300 of the bi-metallic element 202' falling into the groove 302 of the heating element 200. As the heated bi-metallic element 202 continues to curve towards the heating element 200, the heating element 200 is drawn towards the deformed bi-metallic element 202, such that the heating element 200 is brought into alignment with the cooking vessel 104.

In another example, the heating element 200 may comprise at least one protrusion 304 located on a surface of the heating element 200 parallel to the base of the cooking vessel 104. The protrusion 304 may be for example an upstanding block or a square clip or square nail. In one specific example, when the bi-metallic element 202 is heated and therefore bends or curves towards the heating element 200, a protrusion 300 of the bi-metallic element 202' engages with a square nail 304 of the heating element 200, by virtue of the square nail 304 of the heating element 200 being hooked by the protrusion 300 of the bi-metallic element 202'. In another example, the bi-metallic element 202' may comprise a groove for engaging with a corresponding protrusion 304 of the heating element 200, when the bi-metallic element 202' heats up and curves towards the heating element 200.

One bi-metallic element 202 may be sufficient in some scenarios, such as for example when the cooker 100 is small enough to only require limited movement of the heating element 200 or if the cooking vessel 104 tends always to be positioned off-centre in a particular direction (for example, because of physical constraints on the locating of the cooking vessel 104 on the cooker 100). However, a heating element 200 having plural bi-metallic elements 202 gives greater options and flexibility in controlling the movement of the heating element 200. An advantage of having plural bi-metallic elements 202 is that the heating element 200 can be moved in a number of different directions depending on which bi-metallic element(s) 202 is/are hot relative to each other as a result of being in thermal contact with the cooking vessel 104.

When the cooker 100 is operational, if, in an example, a cooking vessel 104 is centred perfectly on the heating area 102 comprising plural bi-metallic elements 202 as shown schematically in FIGS. 2 to 4, all of the bi-metallic elements 202 may be heated equally by conduction of heat from the cooking vessel 104 (or not heated at all if the cooking vessel 104 is not overlying any of the bi-metallic elements 202), resulting in no temperature differential between the bi-metallic elements 202. The bi-metallic elements 202 deform evenly (or remain flat if the bi-metallic elements 202 are not heated at all), and the heating element 200 is therefore not driven to move.

In another example, when the cooker 100 is in operation and the cooking vessel 104 is not fully or centrally aligned with the heating element 200, the cooking vessel 104 will be overlying at least one bi-metallic element 202' more than it overlies the other bi-metallic element(s) 202. The at least one bi-metallic element 202' is caused to heat up and drive the heating element 200 to move. The heating element 200 is driven in the direction of the at least one bi-metallic element 202' underlying the cooking vessel 104 to be more accurately aligned with the cooking vessel 104.

When the bi-metallic element(s) 202 cool down, for example to ambient temperature, the bi-metallic element(s) 202 return(s) to their default linear shape and lie flat within the cooker 100, and the heating element 200 is restored to a default location in the cooker 100. The bi-metallic elements 202 may not be heated and therefore lie flat when the cooker 100 is turned off, when, for example, there is no cooking vessel 104 present on the cooker 100, or when the cooker 100 is functioning and the cooking vessel 104 is centrally aligned with the heating element 200.

In this example, each heating area 102 of the cooker 100 comprises a heating element 200 and eight bi-metallic element 202, such that the heating element 200 is able to be driven in a plurality of directions based on at least one bi-metallic element 202 heating up. Additionally, the bi-metallic elements 202 extend radially from the heating element 200. In this example, the bi-metallic elements 202 are partially above the heating element 200, and partially in the area immediately outside the heating element 200. If, when the cooker 100 is functioning, a cooking vessel 104 is perfectly centred above the heating element 200 and overlying equally above all of the bi-metallic elements 202, the bi-metallic elements 202 are heated uniformly. Therefore the bi-metallic elements 202 all deform uniformly, and the heating element 200 will not be moved in any one direction.

In another example, the bi-metallic elements may be positioned entirely outside the area of the heating element 200. In this example, when a cooking vessel 104 is positioned entirely in the heating area 102, the heating element 200 will not be driven to move. When part of the base of the cooking vessel 104 falls outside of the heating area 102, at least one bi-metallic element 202 may become in thermal contact with the cooking vessel 104. The at least one bi-metallic element 202 will heat up and be caused to deform, such that the heating element 200 is driven to move to be centrally aligned beneath the cooking vessel 104.

In an example, the cooker 100 comprises at least one elastic member (not shown), such as for example a spring or an elastic cable or the like. The elastic member is connected to the heating element 200 and arranged to facilitate movement of the heating element 200 when a bi-metallic element 202 is caused to heat up and therefore pull the heating element 200.

To restore the heating element 200 to its default position centrally under the heating region, it may be sufficient to rely on the relevant bi-metallic element 202 cooling down and driving the heating element 200 back to its default position (at which point the bi-metallic element 202 may disengage from the heating element 200 as discussed above). Alternatively or additionally, a restorative member (not shown), such as for example a spring or an elastic cable or the like, may be connected to the heating element 200 and arranged to restore or assist restoration of the heating element 200 to its default position within the cooker 100.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A cooker comprising:

a heating element;

a supporting structure for supporting a cooking vessel above the heating element;

a bi-metallic element, the bi-metallic element being arranged to drive the heating element to move based on a temperature of the bi-metallic element, a connector arrangement for selectively connecting the bi-metallic element to the heating element when the bi-metallic element is heated so that the bi-metallic element drives the heating element to move when the bi-metallic element is deformed;

wherein the connector arrangement comprises: (i) the heating element comprising one of a groove and a protrusion and (ii) the bi-metallic element comprising one of a groove and a protrusion, such that;

the groove or the protrusion of the heating element selectively engages with the groove or the protrusion of the bi-metallic element when the bi-metallic element is deformed; and the groove or the protrusion of the heating element disengages from the groove or the protrusion of the bi-metallic element when the bi-metallic element is not deformed.

2. A cooker comprising:

a heating element;

a supporting structure for supporting a cooking vessel above the heating element; and plural bi-metallic elements, the bi-metallic elements being configured to move the heating element, based on the respective temperatures of the bi-metallic elements, to be more centrally positioned under the cooking vessel when the cooking vessel is boated above the heating element.

3. The cooker according to claim 1, wherein the bi-metallic element is arranged to extend in a plane radially from the heating element.

4. The cooker according to claim 1, comprising a biasing member arranged to assist movement of the heating element based on an increased temperature of the bi-metallic element.

5. The cooker according to claim 1, comprising a biasing member arranged to assist movement of the heating element to a default location when the heating element is switched off or no cooking vessel is located above the heating element.

6. The cooker according to claim 1, wherein the heating element is an induction heating element.

7. The cooker according to claim 2, wherein each bi-metallic element is arranged to extend in a plane radially from the heating element.

8. The cooker according to claim 2, comprising a biasing member arranged to assist movement of the heating element based on an increased temperature of the bi-metallic elements.

9. The cooker according to claim 2, comprising a biasing member arranged to assist movement of the heating element to a default location when the heating element is switched off or no cooking vessel is located above the heating element.

10. The cooker according to claim 2, wherein the heating element is an induction heating element.

* * * * *